Feb. 19, 1963 R. J. JOHNSON Re. 25,336

VARIABLE FLOW LIVESTOCK FEEDER

Original Filed Jan. 30, 1959 3 Sheets-Sheet 1

INVENTOR.
ROY J. JOHNSON,
BY
Bradbock and Bradbock
ATTORNEYS

Feb. 19, 1963 R. J. JOHNSON Re. 25,336

VARIABLE FLOW LIVESTOCK FEEDER

Original Filed Jan. 30, 1959 3 Sheets-Sheet 2

INVENTOR.
ROY J. JOHNSON,
BY
Bradbrook and Bradbrook
ATTORNEYS.

Feb. 19, 1963 R. J. JOHNSON Re. 25,336

VARIABLE FLOW LIVESTOCK FEEDER

Original Filed Jan. 30, 1959 3 Sheets-Sheet 3

INVENTOR.
ROY J. JOHNSON,
BY
Bradbell and Bradbell
ATTORNEYS

United States Patent Office

Re. 25,336
Reissued Feb. 19, 1963

25,336

VARIABLE FLOW LIVESTOCK FEEDER

Roy J. Johnson, Dawson, Minn., assignor to Futurama Manufacturing Company, Inc., Appleton, Minn., a corporation of Minnesota Original No. 2,970,568, dated Feb. 7, 1961, Ser. No. 790,121, Jan 30, 1959. Application for reissue Apr. 30, 1962, Ser. No. 193,053
9 Claims. (Cl. 119—52)

Matter enclosed in heavy brackets [ ] appears in the original patent but forms no part of this reissue specification; matter printed in italics indicates the additions made by reissue.

This invention relates generally to apparatus for distributing feed to livestock. More particularly, the invention has regard to a feeding device characterized by its adaptability to distribute different types of feed rations, in different quantities, to a plurality of separate feeding pens in which the animals are segregated in groups of like age, size, or condition.

The invention falls in the category of mass feeders, intended for distributing feed to comparatively large numbers of animals, in commercial livestock operations. In this connection, it has been observed that mass feeders heretofore devised have been generally characterized by a lack of flexibility. Thus, a particular feeder may be effeciently usable in distributing feed to a particular, segregated group of animals, but the construction and operational characteristics of the device may prevent it from being used in a manner to distribute feed to a different group of animals falling into another classification as regards size, age, or condition. As a result, in some instances a plurality of mass feeding devices may be required, installed at separate locations, and operable separately from one another. This produces an undesirable increase in the over-all costs of the operation, by reason of the fact that in many instances, labor costs are heavy, due to the requirement of constant attendance to the proper operation of each of the mass feeding devices. Further, the over-all cost of the feeding operation is increased, due to the large amount of equipment which must be purchased. Still further, while the equipment might be usable to advantage in feeding animals of a particular classification, it may be so designed as to prevent its ready conversion to a different use, this being an undesirable feature in view of the fact that at different times during the operation of a stock farm, the ratio of animals of a certain classification to animals of other classifications may change substantially.

The present invention aims to eliminate the above noted deficiencies found in mass feeders heretofore devised. To this end, I have devised an apparatus which, summarized briefly, may be appropriately considered as comprising a supply station, so designed as to permit the supply of any of certain designated feeds or forage, or any combination of said feeds, to a central hopper. The invention includes an auger assembly extending from the hopper, said assembly extending longitudinally and centrally of a large area fenced off into a plurality of different enclosures, the auger assembly being adapted to distribute feed to side troughs disposed at opposite sides of the assembly, each enclosure having access to a trough.

In accordance with the invention, each enclosure or feeding pen contains animals of a different classification. Thus, said enclosures may include a calf yard, a beef cow yard, a fattening yard for steers, and a fattening yard for heifers.

The invention, further summarized, includes means for bodily shifting the auger assembly laterally to a position overlying one or the other of the side troughs. Thus, in one extreme position of the auger assembly, the feed will be distributed to one side trough, so as to be accessible under normal conditions to the animals disposed in the yards or pens at one side of the auger assembly. In another extreme position, the feed is distributed to the other trough, and is accessible from the pens at the other side of the auger assembly. However, the invention includes filler boards or sections, which can be swiftly positioned in overlying relation to the troughs of selected pens or yards, and as a result, when the auger assembly is in either extreme position, it may be caused to operate in such a manner as to supply a different amount of feed to one pen as compared to another pen located at the same side of the auger assembly. Thus, the flow of feed to one pen at a particular side of the auger assembly may be stopped completely, or may be reduced in relation to the flow of feed to another pen immediately adjacent thereto on the same side of the auger assembly.

It may be noted, in this regard, that the apparatus is especially designed for maximum flexibility, and minimum labor costs, in a farming business in which it is necessary to feed varying numbers of cattle and other livestock in separate feeding pens in which the animals are segregated in groups of like age, size or condition. Depending upon the stages of development of the respective groups, it is desirable to feed different rations in different quantities to particular groups, but it is also obviously desirable and advantageous to feed several pens or groups at the same time, from a central feed bunker or feed trough. The present invention, as the main object thereof, is intended to accomplish this result, and is designed to convey feed and forage from a support hopper at one end of the feed bunker, mix the same in transit, and deposit it in varying quantities to the several pens on either side of the device.

Other objects will appear from the following description, the claims appended thereto, and from the annexed drawings, in which like reference characters designate like parts throughout the several views, and wherein:

Figure 1:
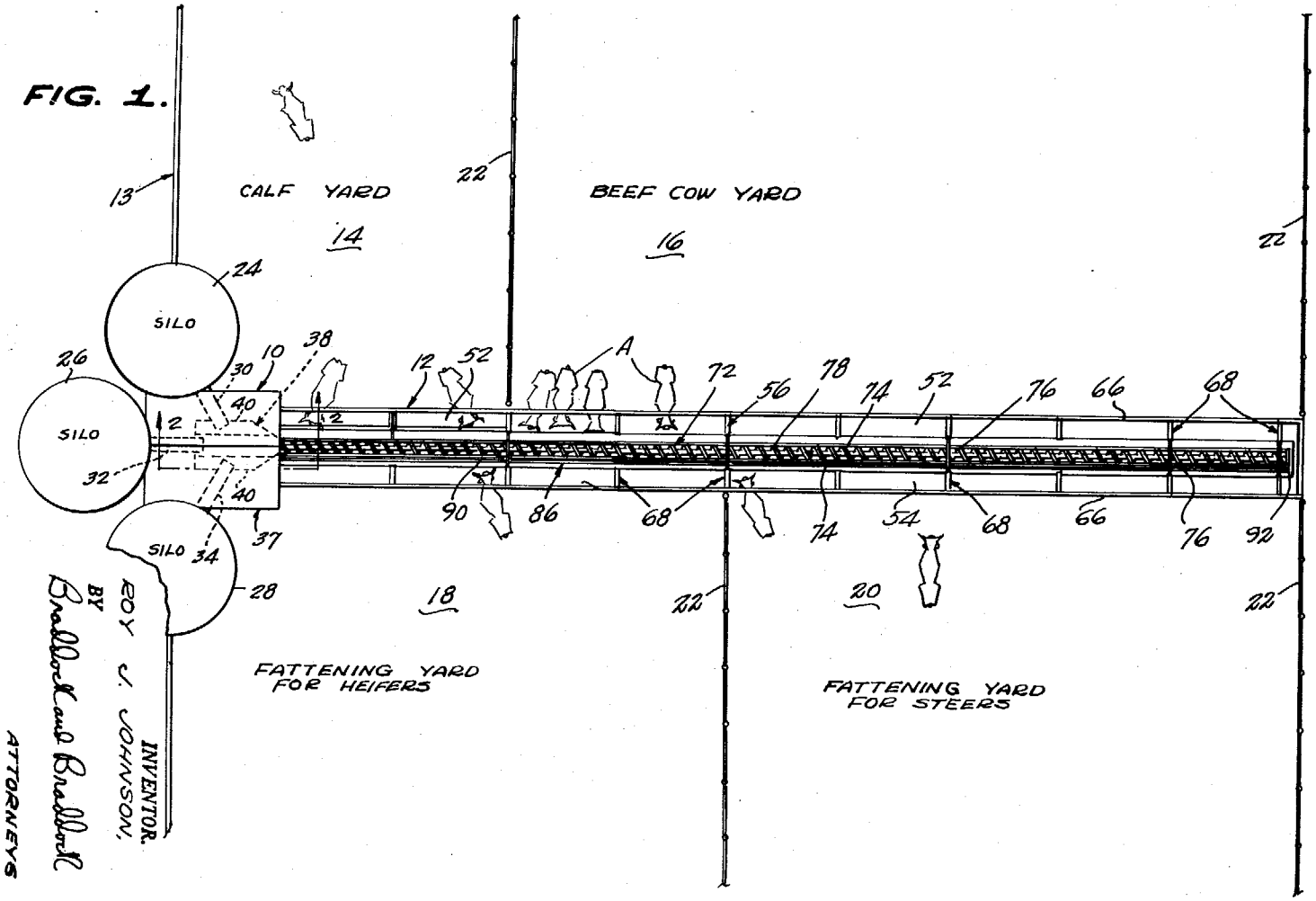
FIG. 1 is a top plan view of the apparatus, with the roof that normally protectively overlies the auger assembly being removed to show details of construction, the apparatus being illustrated somewhat diagrammatically.

Referring to the drawings in detail, it may appropriately be considered that the invention comprises two main assemblies or structures. In view of the movement of feed from one to the other of these assemblies, they can be considered as stations, and accordingly, comprise a supply station generally designated 10, and a distribution station generally designated 12.

The apparatus further includes an animal area generally designated 13, and this is divided into a plurality of feeding enclosures, pens, or yards 14, 16, 18 and 20. Of course, the number and size of the yards may be varied according to the particular operation, the arrangement shown being merely illustrative of one that might be used. Thus, in the illustrated example there is a calf yard 14, a beef cow yard 16, a yard 18 for fattening heifers, and a yard 20 for fattening steers. Yards or pens 14, 16 are at one side of the distribution station 12, while yards 18, 20 are at the other side. Thus, the distribution station bisects longitudinally the animal area 13, cooperating with a plurality of transverse fences 22 in defining the various feeding pens.

Considering now the construction of the supply station, here again, by way of example, a typical arrangement has been shown, that could be varied as desired. In the illustrated example, there are three silos 24, 26, 28, each of which would contain a different kind of feed or silage. The number of silos (which may be appropriately termed supply structures) can be varied, it being merely important that from each supply structure there extends a chute, with the chutes of the several supply structures converging so as to deposit their contents in the head end of the distribution station.

Thus, in the illustrated example chutes 30, 32 and 34 extend from the supply structures 24, 26 and 28 respectively. The several chutes, as shown in FIG. 1 (see also FIG. 2) converge, declining in a direction away from their associated supply structures, for deposit of their contents into a single hopper 38.

It will be seen that any feed contained in a supply structure can be selected for deposit in the hopper, or any combination of feeds.

A plurality of hoppers may be provided, and they may be mounted with swinging spouts to accommodate lateral movement of the auger assembly, thus to permit deposit of various kinds of fed and elements of feed mixtures, such as silage, minerals, concentrates, medications, and grain, onto the auger assembly for mixing enroute to the various feeding pens.

Figure 2:
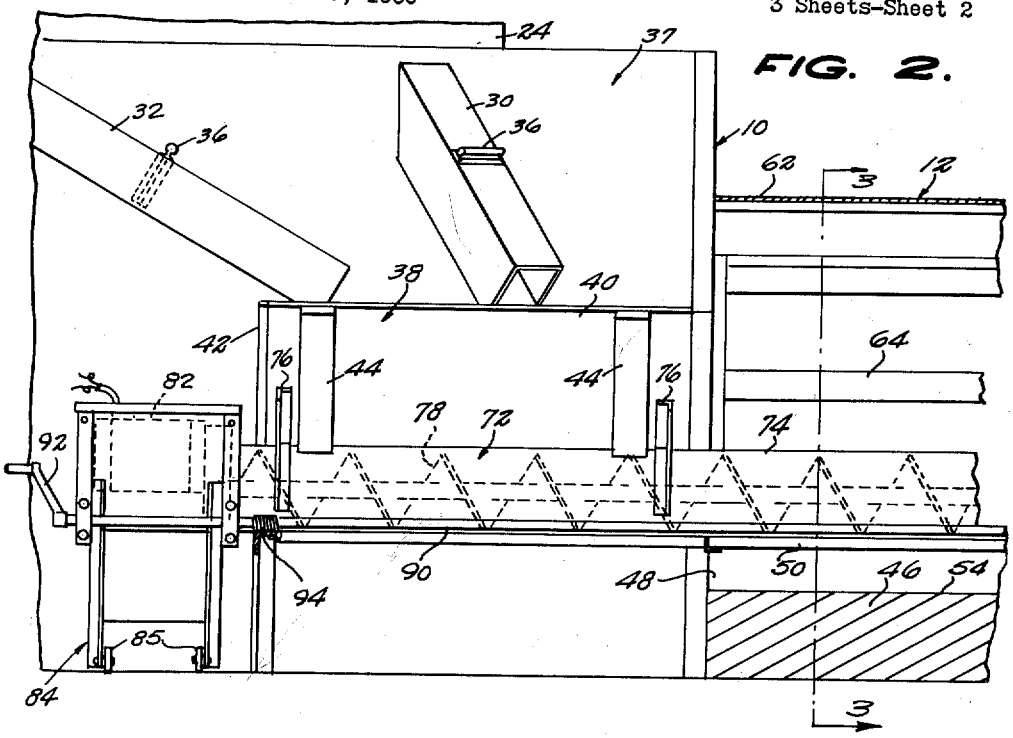
FIG. 2 is an enlarged longitudinal sectional view substantially on line 2—2 in FIG. 1 showing the supply station and the head end of the feed distribution station.

In any event, as shown in FIG. 2, each chute may be provided with a gate or valve 36, to provide for full control of the flow of the feed from the associated supply structure to the hopper 38. Further, it will be understood that although the hopper 38 is shiftable laterally since it comprises a component part of the auger assembly, in each position to which it is shifted it will still be disposed to receive the flow from any one of the chutes. This is readily achieved by making the hopper of sufficient size to cause it to be located below the outlet of all of the chutes, regardless of the position to which the hopper is laterally shifted.

The chutes may discharge their contents into the hopper 38, within a hopper enclosure, shed, or silo room generally designated 37 providing protection of the exposed feed from the elements.

The distribution station may now be described, and includes the hopper 38 already mentioned above. Hopper 38, in the illustrated example, includes downwardly convergent side walls, 40, an end wall 42 and brace members 44 for the side walls.

Extending from the enclosure 37 is an elongated, wide, flat bed bunk or base 46. In a preferred arrangement, this is of concrete.

The bunk 46 includes, over its full length, an upwardly projecting longitudinal partition 48. This is disposed longitudinally and centrally of the bunk, as shown in FIG. 3, and integrally formed upon the top edge of the partition 48 is a wide, flat longitudinal platform 50, overhanging like longitudinal or side troughs 52, 54 defined along opposite sides of the bunk by the partition 48.

Figure 3:
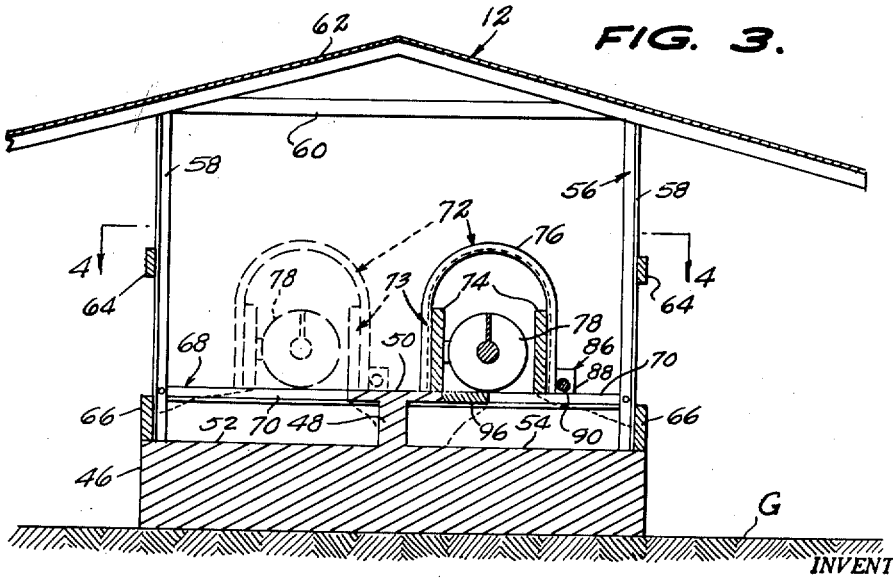
FIG. 3 is a transverse sectional view on the same scale as FIG. 2, taken substantially on line 3—3 of FIG. 2.

The troughs, as will be seen from FIG. 3, are elevated above the ground G, so as to be conveniently accessible to the animals A confined within the various feeding enclosures 14, 16, 18 and 20.

Generally designated at 56 is a steel framework, which can be formed largely of angle iron material, although, this is not of course critical to successful operation of the invention. The framework overlies the troughs, and extends the full length of the bunk, being provided in the illustrated example with uniformly spaced, vertical, upstanding posts 58, transversely braced by cross beams 60 in supporting relation to a roof 62 that protectively overlies the troughs 52, 54 to protect the feed and the auger assembly from the elements.

The posts 58 are fixedly secured to the bunk, and could be embedded at their lower ends in the cementitious material of the bunk. Alternatively, any suitable manner of fixedly mounting the posts in their desired positions can be utilized.

The framework 56 further includes, along opposite sides of the bunk, guard rails 64. These are connected to intermediate portions of the posts 58, the guard rails extending the full length of the bunk, and being elevated above the troughs in such a manner that the animals must insert their heads below the guard rails to obtain access to the feed. This provides for maximum control of the feeding positions of the animals.

Further control of the feeding positions of the animals, as well as retaining means for the feed, is afforded by outer side walls 66 of the troughs. These, like the guard rails, can comprise lengths of stout board stock.

The framework 56 further includes transverse auger assembly guides or trackways 68, which extend across the full width of the bunk, in coplanar relation to platform 50. These are spaced apart uniformly along the length of the bunk, as shown to particular advantage in FIG. 1.

Figure 6:
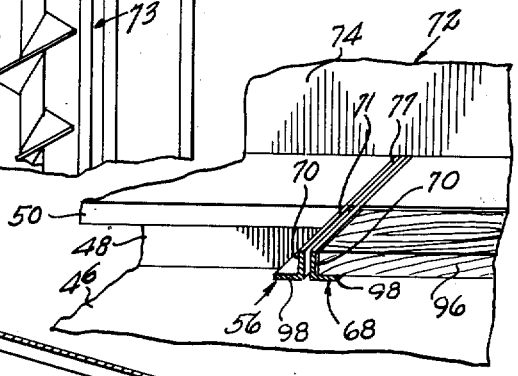
FIG. 6 is an enlarged, fragmentary perspective view showing one of the guides on which the auger assembly is laterally shiftable.

The construction of each guide 68 is shown to particular advantage in FIG. 6. As will be noted, each guide includes a pair of angle iron members 70, oppositely arranged with their vertical legs at the inside, thus to define between the vertical portions of the angle iron guide rails 70 a narrow guide space 71.

At their outer ends, that is, the ends adjacent the respective longitudinal edges of the bunk 46, the guide rails 70 are fixedly secured, by welding or equivalent means, to the respective posts 58.

Generally designated at 72 is an auger assembly, which is bodily shiftable in a lateral direction, as will be readily noted by reference to the full and dotted line positions of said assembly shown in FIG. 3.

The auger assembly 72 includes an auger housing generally designated at 73. This comprises transversely spaced side walls 74, rigidly connected in their spaced relation by transverse connector brackets 76 of inverted U-shape, the legs of which are fixedly secured to the respective side walls 74.

The auger housing, at its bottom, is formed open, and is adapted to be slidably supported upon the several guides 68, for transverse adjustment upon bunk 46. In the illustrated example, the auger housing is provided with transversely disposed, depending guide plates 77, loosely, slidably engaged in the several guide spaces 71. However, other means can be employed, as for example rollers mounted for rolling movement upon the trackways defined by the guides, idlers, etc. It is mainly important that the auger housing be supported for transverse movement, over its full length, between opposite extreme positions shown in full and dotted lines in FIG. 3.

As will be seen from FIG. 1, the auger assembly 72 extends the full distance from hopper 38 to the outer end of the bunk, that is, the auger assembly is coextensive with the side troughs 52, 54.

Figure 5:
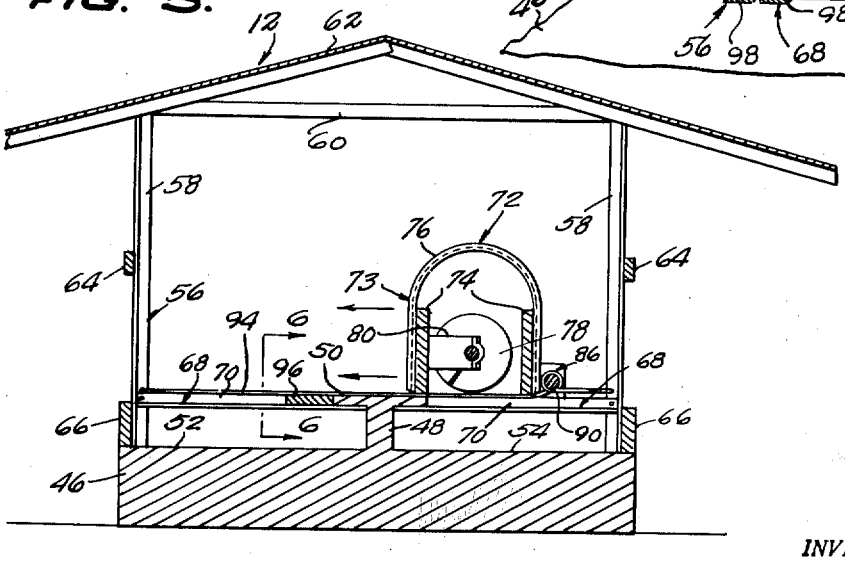
FIG. 5 is a transverse sectional view on the same scale as FIG. 4, taken on line 5—5 of FIG. 4.

Rotatable within the auger housing 73 is an auger or feed screw 78, the shaft of which is journaled in bearings 80 (FIG. 5) mounted upon and projecting laterally inwardly from one of the side walls 74. Drivingly connected to the shaft of the auger is a drive motor 82 (FIG. 2) mounted within the enclosure 37 upon a motor stand 84. Since the motor must shift laterally with the auger, to an extent shown by the full and dotted line positions of the auger in FIG. 3, the stand is movably mounted. By way of example, the stand is shown as including wheels or rollers 85, but obviously, it is merely necessary that some means be designed to insure that the motor will be properly supported for transverse movement with the auger.

Of course, the motor would be of the speed reduction type, having associated therewith a conventional speed reducing means, designed to effect slow speed rotation of the shaft of the auger responsive to energizing of the motor.

The auger assembly 72 further includes an auger assembly shift means generally designated 86. This shift means, in accordance with the invention, should be considered, along with other components of the invention, as being variable to such extent as permissible by the scope of the appended claims. I have devised and have found to be efficient, a shift means 86 that includes laterally projecting bearing blocks 88 secured to and extending laterally outwardly from one of the side walls 74. Journaled in the blocks is an elongated shaft 90 extending the full length of the auger assembly. At opposite ends of the shaft 90 are hand cranks 92.

Figure 4:
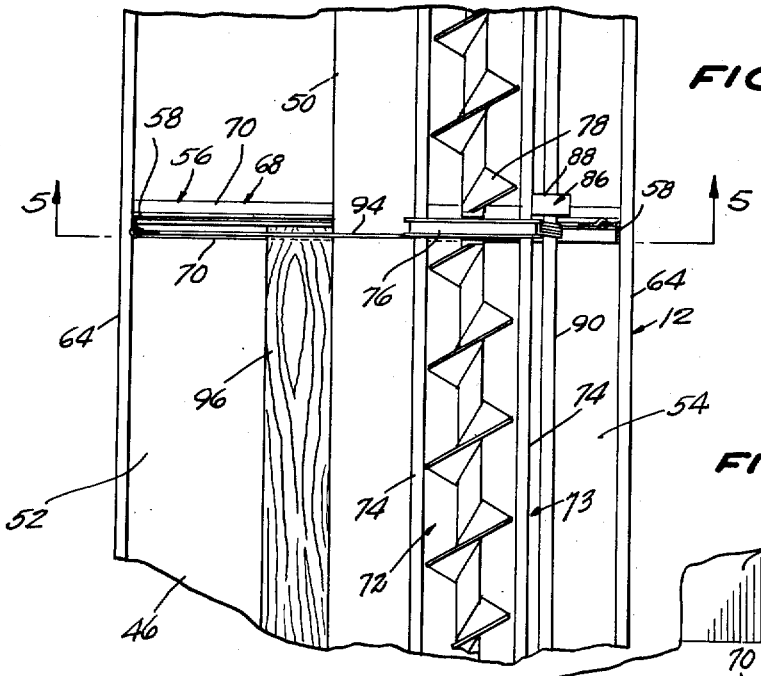
FIG. 4 is a horizontal sectional view on the same scale as FIG. 3, taken substantially on the line 4—4 of FIG. 3.

At selected locations along the length of the shaft 90, a cable 94 is coiled about the shaft. As will be seen from FIGS. 4 and 5, each cable 94 is connected at its opposite ends to corresponding, transversely aligned posts 58. The cable is tensioned between the posts to which it is connected, and is coiled tightly about the shaft. As a result, on rotation of the shaft, in a selected direction, the entire auger assembly will be caused to travel laterally transversely of the platform 50.

In a neutral position of the auger assembly, which has not been illustrated, but which would be disposed midway between the positions shown in full and dotted lines in FIG. 3, the auger housing would be centered in respect to the platform 50, and in these circumstances, would be completely closed at its bottom so that feed within the housing would not be caused to flow into either the trough 52 or the trough 54.

From this neutral position, the housing can be shifted laterally in either direction. In one extreme position, it overlies the trough 54, so that feed within the housing is deposited in said trough. This is the full line position of FIG. 3. In an opposite extreme position, the housing empties its contents into the trough 52. Obviously the housing can be stopped partway between its neutral and one of its extreme positions, so as to reduce the cross sectional area of the open bottom of the housing, thereby to correspondingly reduce the amount of space through which feed can flow into the trough below the housing at the particular time.

Additional control is provided, in accordance with the invention with respect to the flow of the feed from the housing into the trough 52 or 54. Said additional control results from the provision of a plurality of filler boards 96. Each of these would be of a length such as to cause it to extend between adjacent transverse guides 68. At one end, the filler board would be supported upon the horizontal portion 98 of a guide rail 70, while at the other end, the filler board would be supported in a similar manner upon the horizontal portion of another guide rail 70 of the next adjacent guide 68. The boards are thus swifty removable or insertable, as desired, and have the effect of widening the platform wherever they are used.

It will thus be seen that if one should so desire, that portion of trough 52 that is exposed to animals within the calf yard 14 could be closed completely, while the portion of trough 52 exposed within the beef cow yard 16 could be left fully open. In this way, with the auger assembly in the dotted line position shown in FIG. 3, feed would be supplied to the beef cow yard, while being denied to the calf yard, fattening yard for heifers, or the fattening yard for steers. Further, the feed so supplied would be drawn from any one of the supply structures 24, 26, 28, or from any combination of said supply structures whereby to permit the feed to be a selected mixture, desired for animals falling into the classification that permits their segregation in the beef cow yard.

This is of course merely an example of one arrangement. In another arrangement, the trough within the calf yard might be closed only partially, by use of perhaps one filler board. As a result, animals within the yards 14 and 16 might be fed simultaneously, with the feed being supplied to yard 14 at a rate below that selected for the yard or pen 16.

There is, as will be understood, a certain overlap of feeds, that is, animals in different pens may be, at different times, given the same feed or feed mixture. In these circumstances, feed would be simultaneously supplied to pens that are all at one side of the auger assembly, though perhaps in different rates of flow.

It will be readily perceived, from the few examples given above, that there is a very wide variation of rates of supply, mixtures, etc., possible, in a very compact feeding system, with this wide variation yet being possible in the supply of feed to a substantial number of groups of animals falling into different classifications. The apparatus, thus, is designed to and achieves the aim of maximum flexibility in feeding operations, accompanied by a lowering of labor costs and equipment costs.

It will further be seen that the mixture of different feeds, silage, medications, etc., is accomplished by the device while the feed is enroute to the selected distribution point along the auger housing. This eliminates the necessity of pre-mixing of the feed before it is distributed to the animals.

In use, the auger assembly may initially be in its neutral position, after which the feed from the selected supply structure or structures is depositied in the hopper, and is caused to substantially fill the auger housing over the full length thereof. At this point, the auger assembly may be moved to its selected, laterally adjusted position, assuming of course that all filler boards 96 have previously been properly placed. The rate of flow of the feed from the hopper into the auger housing may be correlated with the rate of flow of the feed out of the housing, so that there is at all times a constant flow, with the feed level within the auger housing being maintained at a substantially unchanging level. Or, the auger housing might be filled with the auger in its neutral position, after which the further flow of feed into the auger housing may be halted, and the housing adjusted laterally to left or right as the case may be. This would cause the deposit of a predetermined quantity of feed in the selected troughs, with pre-selection of the quantity fed to the animals at any one time being further possible within a wide range of variations, through the use of the filler boards.

Obviously, many of various other ways of use of the device may suggest themselves, according to the needs of a particular situation. Still further, it will be understood that the fences 22 might be of a portable nature, so as to permit variation in the sizes and number of the different feeding pens from time to time, thus in turn varying the length of a trough that is accessible to animals of a particular classification, at a particular time. This may be desirable in view of constantly changing conditions in farming operations of the kind described, over a course of a year or other cycle of farming operations.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any change in construction that may be permitted within the scope of the appended claims.

What is claimed is:

1. An animal feeder comprising a horizontal base upstanding on a yard surface having longitudinally spaced separate feeding areas extending along opposite sides of the base, said base having an upper surface, an upstanding partition wall on and extending medially along the upper surface of the base and defining feeding troughs at opposite sides of the partition wall, a platform supported on said partition wall and spaced above the upper surface of the base, said platform being narrower than the base and extending at opposite sides of the partition wall and partially across said troughs and spaced from the sides of the base, longitudinally spaced horizontal rails extending across the base and supported above the surface of the base on a level with said platform, single open bottom conveyor housing extending longitudinally of the base and along the base, means slidably mounting the housing on said rails, the open body of the housing being of a width to be closed by said platform in a central position of the housing, an auger conveyor mounted within and extending along the housing, means for rotating the conveyor, a feed supply assembly located at one end of and in supply relation to the conveyor housing, and means connected to the conveyor housing for shifting the conveyor crosswise of the base from its central position to positions over either of the troughs.

2. An animal feeder comprising a horizontal base upstanding on a yard surface having longitudinally spaced separate feeding areas extending along opposite sides of the base, said base having an upper surface, an upstanding partition wall on and extending medially along the upper surface of the base and defining feeding troughs at opposite sides of the partition wall, a platform supported on said partition wall and spaced above the upper surface of the base, said platform being narrower than the base and extending at opposite sides of the partition wall and partially across said troughs and spaced from the sides of the base, longitudinally spaced horizontal rails extending across the base and supported above the surface of the base on a level with said platform, single open bottom conveyor housing extending longitudinally of the base and along the base, means slidably mounting the housing on said rails, the open body of the housing being of a width to be closed by said platform in a central position of the housing, an auger conveyor mounted within and extending along the housing, means for rotating the conveyor, a feed supply assembly located at one end of and in supply relation to the conveyor housing, and means connected to the conveyor housing for shifting the conveyor crosswise of the base from its central position to positions over either of the troughs, said shifting means comprising a shaft journaled on and extending along a side of the conveyor housing, a cable having an intermediate part wound on the shaft and ends secured to portions at opposite sides of the base, and means for rotating said shaft.

3. An animal feeder comprising a horizontal base upstanding on a yard surface having longitudinally spaced separate feeding areas extending along opposite sides of the base, said base having an upper surface, an upstanding partition wall on and extending medially along the upper surface of the base and defining feeding troughs at opposite sides of the partition wall, a platform supported on said partition wall and spaced above the upper surface of the base, said platform being narrower than the base and extending at opposite sides of the partition wall and partially across said troughs and spaced from the sides of the base, longitudinally spaced horizontal rails extending across the base and supported above the surface of the base on a level with said platform, single open bottom conveyor housing extending longitudinally of the base and along the base, means slidably mounting the housing on said rails, the open body of the housing being of a width to be closed by said platform in a central position of the housing, an auger conveyor mounted within and extending along the housing, means for rotating the conveyor, a feed supply assembly located at one end of and in supply relation to the conveyor housing, and means connected to the conveyor housing for shifting the conveyor crosswise of the base from its central position to positions over either of the troughs, a roofed framework mounted on and extending along and overlying said base, said framework having longitudinally spaced posts rising above the platform, said rails extending between and being fixed at their ends to related posts.

4. An animal feeder comprising a horizontal base upstanding on a yard surface having longitudinally spaced separate feeding areas extending along opposite sides of the base, said base having an upper surface, an upstanding partition wall on and extending medially along the upper surface of the base and defining feeding troughs at opposite sides of the partition wall, a platform supported on said partition wall and spaced from the upper surface of the base, said platform being narrower than the base and extending at opposite sides of the partition wall and partially across said troughs and spaced from the sides of the base, longitudinally spaced horizontal rails extending across the base and supported above the upper surface of the base on a level with said platform, single open bottom conveyor housing extending longitudinally of the base and along the base, means slidably mounting the housing on said rails, the open body of the housing being of a width to be closed by said platform in a central position of the housing, an auger conveyor mounted within and extending along the housing, means for rotating the conveyor, a feed supply assembly located at one end of and in supply relation to the conveyor housing, and means connected to the conveyor housing for shifting the conveyor crosswise of the base from its central position to positions over either of the troughs, and removable filler boards extending longitudinally between adjacent and supported on adjacent rails at opposite sides of the platform for reducing the effective width of the open bottom of the conveyor housing in laterally shifted positions of the housing, said boards being selectively removable for determining the rate and amount of feed discharged by the conveyor housing into the troughs relative to different ones of the feeding areas at opposite sides of the base.

*5. An animal feeder comprising a horizontal base upstanding on a surface having longitudinally spaced separate feeding areas extending along opposite sides of the base, said base having an upper surface, an upstanding partition wall on and extending medially along the upper surface of the base and defining feeding troughs at opposite sides of the partition wall, a platform supported on said partition wall and spaced above the upper surface of the base, said platform being narrower than the base, longitudinally spaced horizontal rails extending across the base and supported above the surface of the base, an open bottom conveyor housing extending longitudinally of the base and along the base, means movably mounting the housing on said rails, the open bottom of the housing being of a width to be closed by the platform in a central position of the housing, a conveyor mounted within and extending along the housing, for conveying feed along the inside of the housing, means for driving the conveyor, a feed supply assembly located at one end of and in supply relation to the conveyor housing, and means connected to the conveyor housing for shifting the conveyor housing crosswise of the base from its central position to positions over either of the troughs.*

*6. An animal feeder comprising a horizontal base upstanding on a yard surface, said base having an upper base surface, an upstanding partition wall extending longitudinally along said upper base surface and, with said base surface, defining a feeding trough at one side of said wall, said wall having a substantially horizontal upper wall surface spaced from and above said base surface, longitudinally spaced horizontal rails extending across the base and supported above the surface of the base, a single open bottom conveyor housing extending longitudinally of the base and along the base, means movably mounting the housing on said rails, the open bottom of the housing being of a width to be closed by said upper wall surface*

*when said housing is situated over said wall, a conveyor mounted within and extending along the housing to convey feed along the inside of the housing, means for driving the conveyor, a feed supply assembly located at one end and in supply relation to the conveyor housing, and means connected to the conveyor housing for shifting the conveyor crosswise of the base from position over the wall to position over the trough.*

*7. An animal feeder comprising a horizontal base, an upstanding wall extending longitudinally along said base and having an upper wall surface, said wall and said base defining a feed trough located adjacent said upper surface and disposed beneath said surface, a plurality of spaced guide members extending transversely of said upper surface and feed trough, a conveyor housing extending longitudinally of said feed trough and having a substantially continuous opening in the bottom thereof, the bottom of said conveyor housing being disposed substantially at the level of said upper surface and said opening having a width less than the width of said upper surface whereby said opening will be closed off by said upper surface when the conveyor housing is located there above, means for mounting said conveyor housing for movement on said guide members, a conveyor mounted within said conveyor housing, means for moving said conveyor within the housing to convey feed through the said conveyor housing, and means connected to the conveyor housing for shifting the conveyor housing transversely of the trough.*

*8. An animal feeder comprising a horizontal base, an upstanding wall extending longitudinally along said base and having an upper wall surface, said wall and said base defining a feed trough located adjacent said upper surface and disposed beneath said surface, a plurality of spaced guide members extending transversely of said upper surface and feed trough, a conveyor housing extending longitudinally of said feed trough and having a substantially continuous opening in the bottom thereof, the bottom of said conveyor housing being disposed substantially at the level of said upper surface and said opening having a width less than the width of said upper surface whereby said opening will be closed off by said upper surface when the conveyor housing is located thereabove, means for mounting said conveyor housing for movement on said guide members, conveyor means for conveying feed along the interior of said housing, means connected to the conveyor housing for shifting the conveyor housing transversely of the trough, and a removable closure member extending transversely from said upper surface over a portion of said trough and mounted substantially flush with said horizontal surface, said closure member serving to restrict the flow of feed from said conveyor housing into said portion of the trough.*

*9. An animal feeder comprising a horizontal base, an upstanding wall extending longitudinally along said base and having an upper wall surface, said wall and said base defining a feed trough located adjacent said upper surface and disposed beneath said surface, a plurality of spaced guide members extending transversely of said upper surface and feed trough, a conveyor housing extending longitudinally of said feed trough and having a substantially continuous opening in the bottom thereof, the bottom of said conveyor housing being disposed substantially at the level of said upper surface and said opening having a width less than the width of said upper surface whereby said opening will be closed off by said upper surface when the conveyor housing is located thereabove, means for mounting said conveyor housing for movement on said guide members, a conveyor mounted within said conveyor housing, means for moving said conveyor within the housing to convey feed through said conveyor housing, a feed supply assembly located at one end of and in supply relation to the conveyor housing, a shaft journalled on and extending along a side of the conveyor housing, means for rotating said shaft, and means operably connected to the shaft for moving the conveyor housing transversely of the trough on said guide members in accordance with rotation of said shaft.*

References Cited in the file of this patent or the original patent

UNITED STATES PATENTS

| | | |
|---|---|---|
| 2,679,953 | Field | June 1, 1954 |
| 2,841,115 | Weber | July 1, 1958 |
| 2,867,314 | Hansen | Jan. 6, 1959 |